No. 874,479. PATENTED DEC. 24, 1907.
R. J. ANDERSON.
TEA AND COFFEE POT.
APPLICATION FILED MAY 7, 1907.
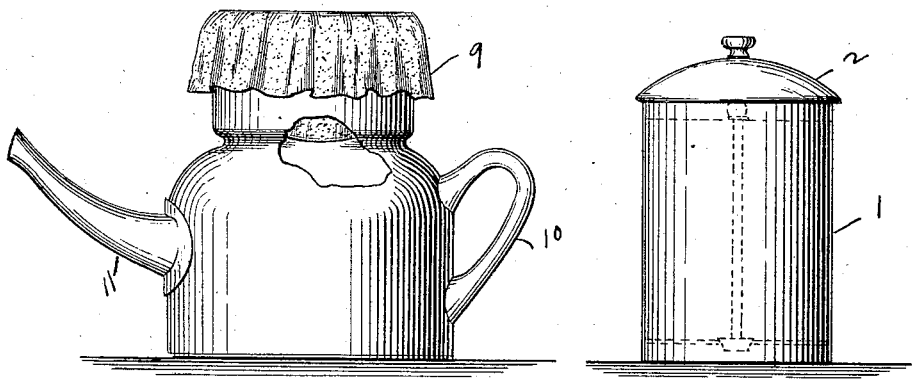
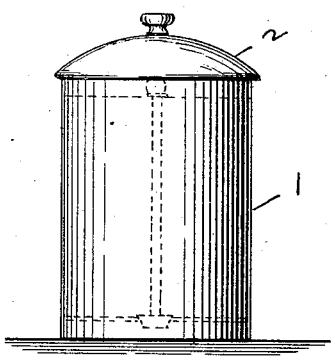
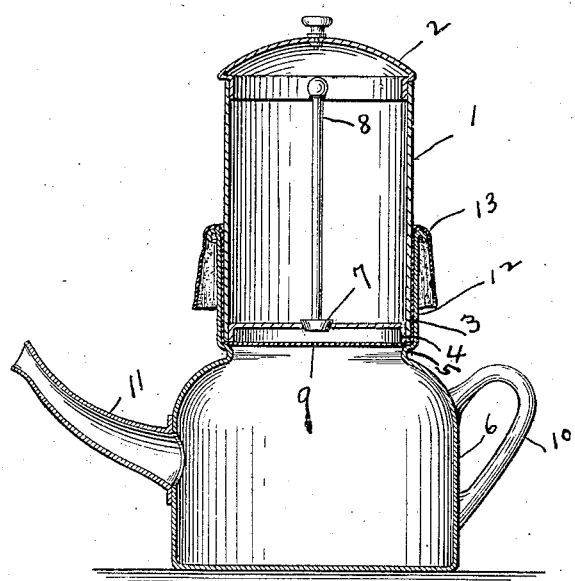
WITNESSES: INVENTOR
Robert John Anderson
BY
Jos. H. Freeman ATTORNEY

UNITED STATES PATENT OFFICE.

ROBERT JOHN ANDERSON, OF NEW YORK, N. Y.

TEA AND COFFEE POT.

No. 874,479.  Specification of Letters Patent.  Patented Dec. 24, 1907.

Application filed May 7, 1907. Serial No. 372,429.

*To all whom it may concern:*

Be it known that I, ROBERT JOHN ANDERSON, a citizen of the United States, and a resident of New York, county and State of New York, have invented certain new and useful Improvements in Tea and Coffee Pots, of which the following is a specification.

The invention relates to cooking utensils; and, while it may be embodied in constructions adapted for various purposes, it is more particularly applicable to tea and coffee pots.

Objects of the invention are to provide a construction of the character referred to which shall be simple and efficient in operation and easily kept clean, and which shall also be simple and cheap in construction and durable. These and other objects of the invention will in part be obvious and in part made clear from the following description.

The invention consists in the novel parts, improvements, combinations and features of construction herein shown and described.

The accompanying drawings, which are referred to herein and made a part hereof, illustrate one embodiment of the invention, the same serving in connection with the description herein to explain the principles thereof.

Of the drawings: Figure 1 is a vertical central section of a tea or coffee pot constructed in accordance with my invention; Fig. 2 is a front elevation of a detail; and Fig. 3 is a side elevation of a detail, a part being broken away.

A tea or coffee pot constructed in accordance with certain features of my invention comprises a lower receptacle having an inner annular shoulder and a portion extending upward from said shoulder, an upper receptacle having a diaphragm located above the bottom to form a depending flange adapted to rest on said annular shoulder, said diaphragm having a valve opening, and a valve to close said opening, said receptacles being adapted to receive and secure between them a strainer.

In accordance with one feature of the invention, the strainer consists of a cloth extending across the bottom of the upper receptacle and secured between the downwardly extending flange thereof and said annular shoulder.

In accordance with another feature of the invention, the valve is unattached to the receptacle and has a stem extending to a point near the top of the upper receptacle which has an open top with a cover removably fitted thereto.

These and other features of the invention will be more particularly set forth in the following description.

Referring now in detail to the particular embodiment of the invention illustrated in the drawings, a receptacle 1 is provided in which the tea or coffee is macerated, said receptacle preferably having an open top with a cover 2 removably fitted thereto. A diaphragm 3 forming the bottom of the receptacle is, preferably and as shown, located above the lower edge of the side wall of the receptacle so as to form, partly by the lower portion of the said side walls and partly by the downwardly turned edge of the diaphragm, a stiffened depending flange 4 which rests upon the annular shoulder 5 of the lower receptacle 6 hereinafter referred to. When the tea or coffee has been sufficiently steeped, the liquid flows through an opening in the diaphragm 3 to the lower receptacle 6.

An important feature of the invention is the means provided for regulating the flow of the liquid from the upper to the lower receptacle. While this may be done in any suitable way, preferably and as shown, a valve 7 fits into the opening in the diaphragm 3, said valve, preferably, being unattached to the receptacle and having a stem 8 extending to a point near the top of the upper receptacle. By seating and unseating this valve 7 the flow of the liquid may be regulated at will.

Another important feature of the invention resides in the means provided for straining the tea or coffee after maceration. While this strainer may be of any suitable construction, preferably and as shown, the strainer is formed by stretching a suitable straining material 9, preferably cloth, across the bottom of the upper receptacle and securing the same between the downwardly extending flange 4 and the annular shoulder 5 of the lower receptacle. It will also be seen that suitable space is thus provided between the diaphragm and the strainer for the reception of the grounds of the tea or coffee.

After straining, the tea or coffee is stored until used in the lower receptacle 6, which has a body of the usual construction with handle 10 and spout 11. At the upper portion however it has the inner annular shoulder 5 heretofore described upon which rests the flange 4 of the upper receptacle, and the lower receptacle projects a suitable distance above the annular shoulder to form a casing 12 for the upper receptacle, said casing terminating in a bead 13. This casing 12 serves to guide the upper receptacle into contact with the shoulder 5 and to hold it there and at the same time form a temporary receptacle for any liquid that may escape between the lower edge of the upper receptacle and the shoulder 5. The strainer 9 may be carried any desired distance upward between the upper and lower receptacles, and if desired, may be lapped over the bead of the lower receptacle, as shown in Fig. 3. If desired, also, the upper receptacle may be removed and a cover placed over the lower receptacle.

The device may be operated as follows: The parts being assembled, as illustrated in Fig. 1, the cover 2 is removed, the material to be macerated together with the macerating liquid is placed in the receptacle 1 and the cover replaced. When the material has been sufficiently macerated, the cover is removed and the valve 7 unseated by means of the rod 8, the valve and rod being left in the receptacle 1 and the cover replaced, if desired. After the liquid has percolated through the strainer, it may be poured from the lower receptacle through the spout 7 without removing the upper receptacle.

It will be seen that the construction of the device is of such a nature and the operation of the same so simple that the device may be used for making tea or coffee on the dining table with the greatest ease and cleanliness. It will also be seen that the device comprises but few parts and that every part is easily accessible for cleaning.

Advantages other than those heretofore mentioned will be obvious to those skilled in the art.

It is to be understood that my invention in its broader aspects is not limited to the precise construction shown nor to any particular construction by which the invention has been or may be carried into effect, as many changes may be made in the details of the parts without departing from the main principles of the invention and without sacrificing its chief advantages.

I claim:

1. A tea or coffee pot comprising a lower receptacle having an inner annular shoulder and a portion extending upward from said shoulder, an upper receptacle having a diaphragm located above the bottom forming with the lower edge of the upper receptacle a depending flange adapted to rest on said annular shoulder, said diaphragm having a valve opening, and a valve to close said opening.

2. A tea or coffee pot comprising a lower receptacle having an inner annular shoulder and a portion extending upward from said shoulder, an upper receptacle having a diaphragm located above the bottom forming with the lower edge of the upper receptacle a depending flange adapted to rest on said annular shoulder, said diaphragm having a valve opening, a valve to close said opening, and a cloth strainer extending across the bottom of the upper receptacle and secured between the downwardly extending flange thereof and said annular shoulder.

3. A coffee or tea pot comprising a lower receptacle having a pouring spout and an inner annular shoulder and a portion extending upward from said shoulder, an upper receptacle having an open top and a diaphragm located above the bottom forming with the lower edge of the upper receptacle a depending flange adapted to rest on said annular shoulder, said diaphragm having a valve opening, a valve to close said opening, said valve being unattached to the receptacle and having a stem extending to a point near the top of the upper receptacle, a cover removably fitted to said upper receptacle, and a cloth strainer extending across the bottom of the upper receptacle and secured between the downwardly extending flange thereof and said annular shoulder.

In testimony whereof, I have signed my name to this specification, in the presence of two subscribing witnesses.

ROBERT JOHN ANDERSON.

Witnesses:
WM. J. DOLAN,
EDWIN SEGER.